(12) United States Patent
Stougaard et al.

(10) Patent No.: US 8,180,401 B2
(45) Date of Patent: May 15, 2012

(54) METHOD AND APPARATUS FOR PROVIDING A CARD APPLICATION TOOLKIT COMMAND FOR REPORTING TERMINAL ENVIRONMENTAL INFORMATION

(75) Inventors: Keld Stougaard, Karlslunde (DK); Joergen Svare, Hoeje Taastrup (DK)

(73) Assignee: Nokia Corporation (FI)

( * ) Notice: Subject to any disclaimer, the term of this patent is extended or adjusted under 35 U.S.C. 154(b) by 432 days.

(21) Appl. No.: 12/467,872

(22) Filed: May 18, 2009

(65) Prior Publication Data

US 2010/0291971 A1 Nov. 18, 2010

(51) Int. Cl.
*H04B 1/38* (2006.01)

(52) U.S. Cl. .................................. 455/558; 455/423

(58) Field of Classification Search .............. 455/558, 455/343.1, 343.4, 423
See application file for complete search history.

(56) References Cited

U.S. PATENT DOCUMENTS

| 7,589,629 B2 * | 9/2009 | Tupman et al. | 340/539.11 |
|---|---|---|---|
| 7,689,256 B2 * | 3/2010 | Jin et al. | 455/574 |
| 8,014,789 B2 * | 9/2011 | Breed | 455/456.1 |
| 2005/0244014 A1 | 11/2005 | Elko et al. | |
| 2006/0184379 A1 * | 8/2006 | Tan et al. | 705/1 |

FOREIGN PATENT DOCUMENTS

| CN | 101685035 A | 3/2010 |
|---|---|---|
| DE | 203 02 077 U1 | 8/2003 |
| JP | 2008 152525 A | 7/2008 |
| KR | 2007 0019239 A | 2/2007 |

OTHER PUBLICATIONS

International Search Report and Written Opinion for Application No. PCT/IB2010/001136 dated Sep. 13, 2010.

\* cited by examiner

*Primary Examiner* — Brian Young
(74) *Attorney, Agent, or Firm* — Alston & Bird LLP

(57) ABSTRACT

An apparatus for providing a card application toolkit command for reporting terminal environmental information may include at least one processor and at least one memory storing computer program code configured to, with the at least one processor, cause the apparatus or another apparatus to perform at least providing a command associated with a card application toolkit, from a user identity module of a mobile terminal, to direct the mobile terminal to provide environmental condition information to the user identity module, receiving the environmental condition information via a response to the command, and performing a function with respect to the environmental condition information.

20 Claims, 3 Drawing Sheets

METHOD AND APPARATUS FOR PROVIDING A CARD APPLICATION TOOLKIT COMMAND FOR REPORTING TERMINAL ENVIRONMENTAL INFORMATION

TECHNOLOGICAL FIELD

Embodiments of the present invention relate generally to mobile terminal technology and, more particularly, relate to a method and apparatus for providing a card application toolkit command for reporting terminal environmental information such as, for example, terminal temperature.

BACKGROUND

In order to provide easier or faster information transfer and convenience, telecommunication industry service providers are continually developing improvements to existing communication networks. As a result, wireless communication has developed increased reliability and quality and has become increasingly popular in recent years. Along with the expansion and improvement of wireless communication networks, mobile electronic devices used for wireless communication have also been continually improving. In this regard, due at least in part to reductions in size and cost, along with improvements in battery life and computing capacity, mobile electronic devices have become more capable, easier to use, and cheaper to obtain. Due to the now ubiquitous nature of mobile electronic devices, people of all ages and education levels are utilizing mobile terminals to communicate with other individuals or contacts, receive services and/or share information, media and other content.

With the proliferation of mobile terminals, it is inevitable that some of the mobile terminals will be exposed to difficult operating environments. In this regard, exposure to heat, cold, humidity, and various other environmental factors may cause component failure in some cases. Furthermore, dropping and other causes of physical shock may damage components in some instances. Additionally, some components may fail due to normal circumstances such as reaching a rated end of life or other potentially abnormal circumstances. Manufacturers may, in some cases, provide warrantees or guarantees regarding component lifespan in an effort to market their products and induce confidence in their brands. In any case, users that experience failures of one type or another can be expected to either buy a new device or seek repair services for the affected device. In cases where some form of warrantee or guarantee is involved, the users will often choose device repair over buying a new device. Coverage provided for a particular component may only be applicable to cover component failure in the event of exposure to specific ranges of environmental conditions. Thus, if a component is exposed to out of range conditions, the coverage may not apply. However, when the user brings a device in for repair, it may be difficult or impossible to determine the environmental conditions to which the device has been exposed.

Accordingly, it may be desirable to provide a mechanism by which at least some environmental conditions may be determinable for certain mobile terminal components.

BRIEF SUMMARY

A method, apparatus and computer program product are therefore provided that enable the provision of a card application toolkit command to report environmental conditions such as temperature. Accordingly, warrantee or guarantee issues related to environmental conditional requirements may be managed in an improved manner.

In one exemplary embodiment, a method for providing a card application toolkit command for reporting terminal environmental information is provided. The method may include providing a command associated with a card application toolkit, from a user identity module of a mobile terminal, to direct the mobile terminal to provide environmental condition information to the user identity module, receiving the environmental condition information via a response to the command, and performing a function with respect to the environmental condition information.

In another exemplary embodiment, a computer program product for providing a card application toolkit command for reporting terminal environmental information is provided. The computer program product may include at least one computer-readable storage medium having computer-executable program code instructions stored therein. The computer-executable program code instructions may include program code instructions for providing a command associated with a card application toolkit, from a user identity module of a mobile terminal, to direct the mobile terminal to provide environmental condition information to the user identity module, receiving the environmental condition information via a response to the command, and performing a function with respect to the environmental condition information.

In another exemplary embodiment, an apparatus for providing a card application toolkit command for reporting terminal environmental information is provided. The apparatus may include at least one processor and at least one memory storing computer program code configured to, with the at least one processor, cause the apparatus or another apparatus to perform at least providing a command associated with a card application toolkit, from a user identity module of a mobile terminal, to direct the mobile terminal to provide environmental condition information to the user identity module, receiving the environmental condition information via a response to the command, and performing a function with respect to the environmental condition information.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
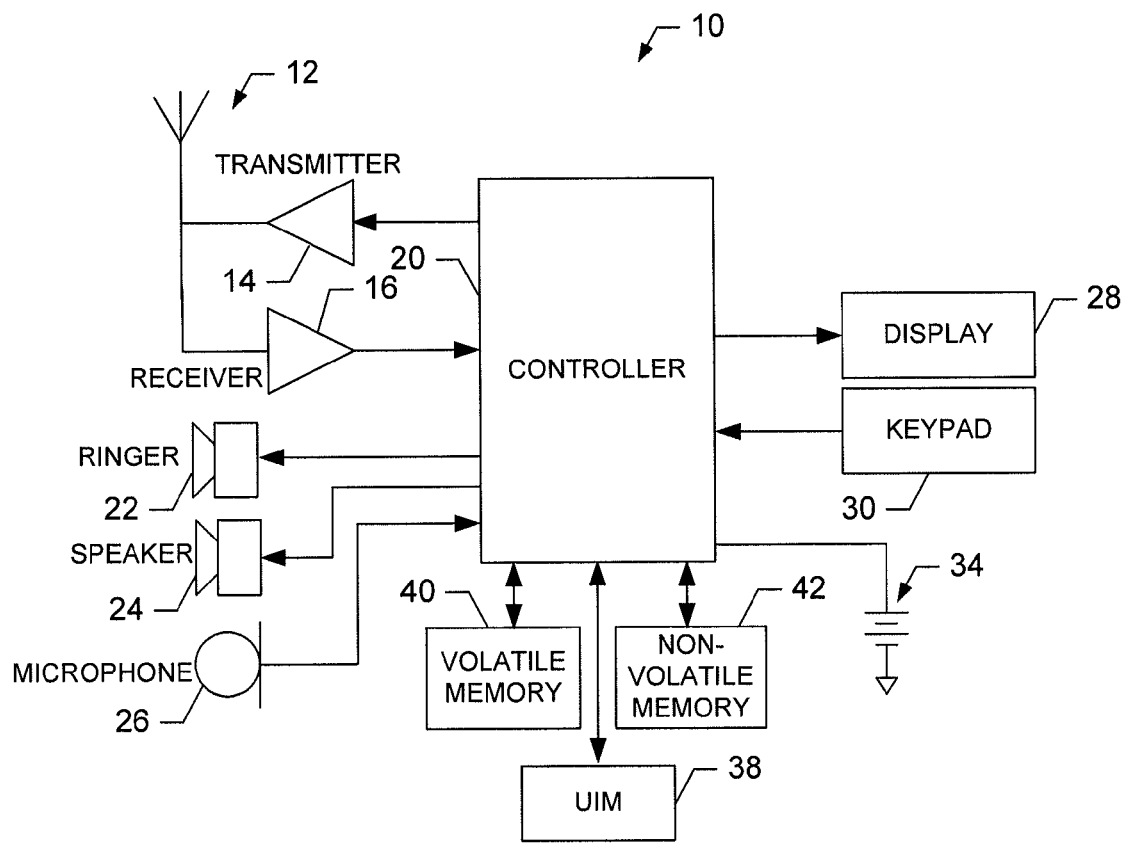
FIG. 1 is a schematic block diagram of a mobile terminal according to an exemplary embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements.

Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

A card application toolkit (CAT) is currently in use in many mobile terminals. The CAT is an application program interface (API) implemented in the mobile terminal. The CAT may be implemented on a user identity module (UIM) or smart card of the mobile terminal, such as, for example a subscriber identity module (SIM), a universal integrated circuit card (UICC), a universal subscriber identity module (USIM), a removable user identity module (R-UIM), etc. Similar to a SIM application toolkit (SAT), which is a global system for mobile communications (GSM) specific set of commands that define how the card should interact with outside devices and extends the communication protocol between the card and the mobile terminal, a CAT defines how a smart card or UIM interacts with its corresponding mobile terminal and other devices. CATs are currently stored on the UIMs of many mobile terminals and are used to allow applications implemented on the UIM to access and utilize many of the mobile terminal's features. The UIM or smart card is often seen as an advantageous platform for implementing certain applications due to the security inherent in the UIM and the ease of use of the UIM.

In some embodiments of the present invention, a CAT is provided that is configured to support a command that is provided to enable the UIM to receive information regarding mobile terminal environmental conditions such as temperature. Thus, for example, the CAT command may provide the UIM with temperature information that can be examined in relation to warranty claims to see if the terminal was subjected to conditions that void the warranty. In some cases, the UIM may report the temperature information when requested, periodically or routinely to a network device of the network operator. However, in other cases, the UIM may record the information in a memory of the mobile terminal itself. Moreover, in an exemplary embodiment, the UIM may be configured to record temperature or other environmental information in response to a specific stimulus, such as temperature falling outside of a specified range.

FIG. 1 illustrates a block diagram of a mobile terminal 10 that may benefit from embodiments of the present invention. It should be understood, however, that a mobile terminal as illustrated and hereinafter described is merely illustrative of one type of mobile terminal that may benefit from embodiments of the present invention and, therefore, should not be taken to limit the scope of embodiments of the present invention. As such, numerous types of mobile terminals, such as portable digital assistants (PDAs), pagers, mobile televisions, laptop computers, mobile telephones, radios, gaming devices, global positioning system (GPS) device, combinations of the preceding devices and other types of data, voice and text communications devices, can readily employ embodiments of the present invention. Furthermore, it should be understood that, although some embodiments of the present invention will be described in detail with respect to employment in connection with a CAT on a UIM, the CAT is representative of a generic application toolkit configured to define how a UIM (representative of a generic smart card) interacts with its corresponding mobile terminal and other devices.

Referring now to FIG. 1, a mobile terminal 10 may include an antenna 12 (or multiple antennas) in operable communication with a transmitter 14 and a receiver 16. The mobile terminal 10 of this example further includes a controller 20 or other processor that provides signals to and receives signals from the transmitter 14 and receiver 16, respectively. The signals include signaling information in accordance with the air interface standard of an applicable cellular or wireless communication system, and also user speech and/or other data. In this regard, the mobile terminal 10 is capable of operating with one or more air interface standards, communication protocols, modulation types, and access types. By way of illustration, the mobile terminal 10 may be capable of operating in accordance with any of a number of first, second, third and/or fourth-generation communication protocols or the like.

In an exemplary embodiment, the controller 20 includes circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 may be allocated between these devices according to their respective capabilities. The controller 20 thus may also include the functionality to convolutionally encode and interleave messages and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then enable the mobile terminal 10 to transmit and receive Web content, such as location-based content, according to a Wireless Application Protocol (WAP), for example.

The mobile terminal 10 of this example also comprises a user interface including an output device such as a conventional earphone or speaker 22, a ringer 24, a microphone 26, a display 28, and a user input interface, all of which are coupled to the controller 20. The user input interface, which enables the mobile terminal 10 to receive data input by the user, may include any of a number of devices allowing the mobile terminal 10 to receive data, such as a keypad 30, a touch display (not shown) or other input device. In embodiments including the keypad 30, the keypad 30 may include a QWERTY keyboard, numeric (0-9) and/or related keys (#, *), and other keys used for operating the mobile terminal 10. The mobile terminal 10 may further include a battery 34, such as a vibrating battery pack, for powering various circuits that are utilized to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may be an example of a smart card and may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. However, the UIM 38 may also, in some cases, execute certain applications and issue or respond to commands.

In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like. The memories can store any of a number of pieces of information, and data, some of which may be used by the mobile terminal 10 to implement the functions of the mobile terminal 10.

Figure 2:
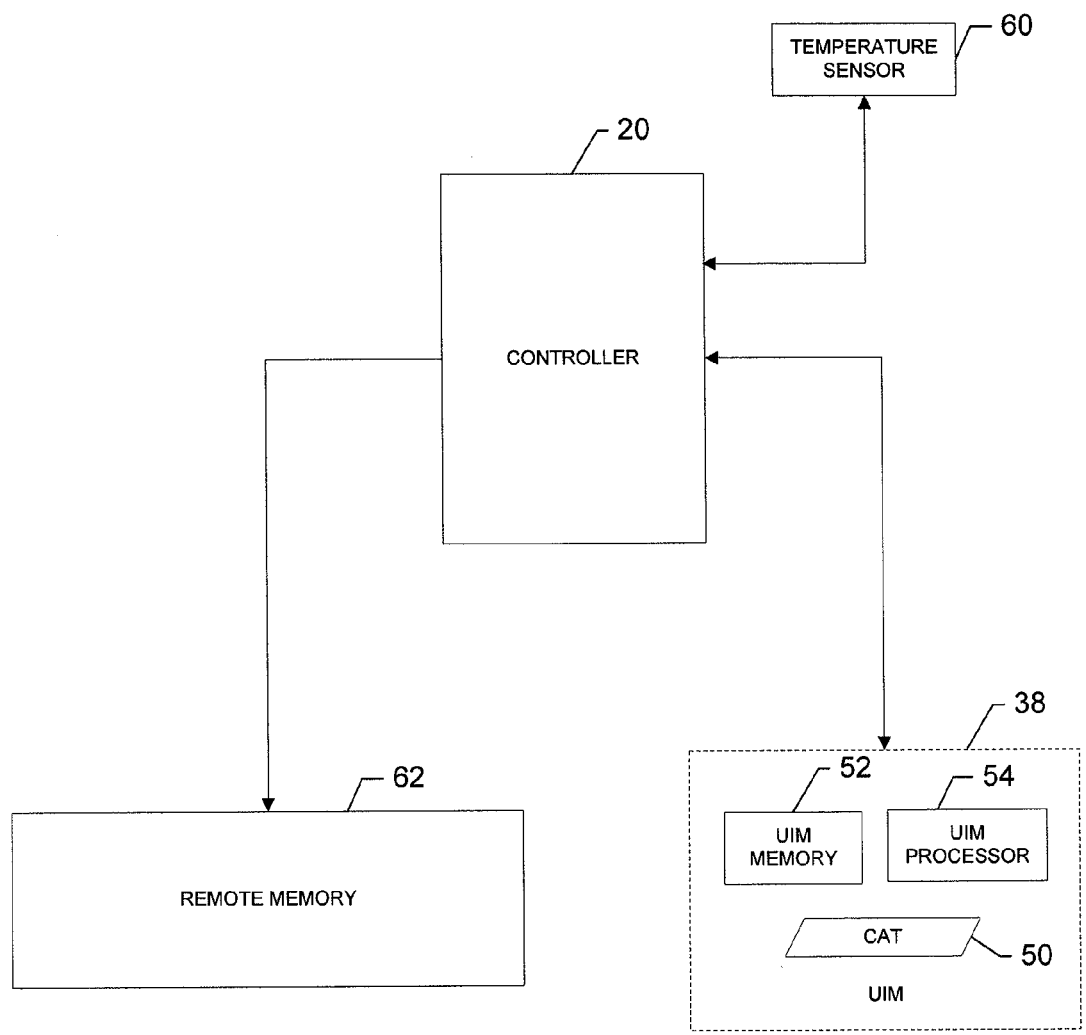
FIG. 2 is a schematic block diagram of a portion of a mobile terminal according to an exemplary embodiment of the present invention.

An exemplary embodiment of the invention will now be described with reference to FIG. 2, in which certain elements of the mobile terminal 10 of FIG. 1 are shown in greater detail. It should be noted, however, that while FIG. 2 illustrates one example of a configuration of a mobile terminal for employing an exemplary embodiment, numerous other configurations may also be used to implement embodiments of the present invention. Referring now to FIG. 2, a card application toolkit (CAT) 50 may be stored on the UIM 38. In this regard, for example, the CAT 50 may be stored in UIM memory 52. The UIM memory 52 may be an electronic computer readable storage medium in which data may be stored. The UIM 38 may also include a UIM processor 54, which may be a processor or other processing element configure to execute instructions or other logical functions. In some embodiments, the CAT 50 may be embodied as logical functions implemented by the UIM processor 54 or instructions executed by the UIM processor 54.

The processors described herein (e.g., the UIM processor 54 and the controller 20) may be embodied in a number of different ways. For example, the processors may be embodied as various processing means such as one or more instances of a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processors may be configured to execute instructions stored in a memory device or otherwise accessible to the processors. As such, whether configured by hardware or software methods, or by a combination thereof, the processors may each represent an entity (e.g., physically embodied in circuitry) capable of performing operations according to embodiments of the present invention while configured accordingly. Thus, for example, when a processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein when the instructions are executed. Moreover, in some cases, the processor may be a processor of a specific device (e.g., a mobile terminal or smart card) adapted for employing embodiments of the present invention by further configuration of the processor by instructions for performing the operations described herein.

As described previously, the CAT 50 according to this example is an application program interface (API) that allows applications implemented on the UIM 38 to access and utilize many features that the mobile terminal 10 is capable of employing. As such, the CAT 50 may send messages to the controller 20 requesting that the controller 20 activate a particular feature. For example, the CAT 50 may activate such features as calling, sending short messages, placing menu items within a structure of the user interface of the mobile terminal 10, obtaining or reporting location information regarding the mobile terminal 10, etc.

According to an exemplary embodiment, the CAT 50 may be further configured to provide a command that may be issued by the UIM processor 54 to the controller 20, directing the controller 20 to provide environmental condition information such as temperature information to the UIM 38. As such, for example, the mobile terminal 10 may include an environmental condition sensor such as temperature sensor 60, which may include a thermometer or other device capable of determining temperature. In some cases, the temperature sensor 60 may be associated with a particular component of the mobile terminal 10 (e.g., the battery 34, or the UIM 38). However, the temperature sensor 60 could alternatively measure a general temperature within a case or housing of the mobile terminal 10. In any case, the temperature sensor 60 may be an apparatus configured to sense temperature (e.g., in Fahrenheit or Celsius) and convert the sensed temperature into a digital value that may be signaled to the controller 20. The temperature sensor 60 may be configured to continuously measure temperature, to measure temperature at defined intervals or under specifically defined circumstances, or to measure temperature in response to a request for temperature information.

In response to receiving the command with respect to provision of the temperature information, the controller 20 may request or otherwise acquire temperature information from the temperature sensor 60 and communicate the temperature information to the UIM 38. Thus, in this example, the controller 20 may function as a conduit for messaging used by the UIM 38 (e.g., via the CAT 50) to acquire the temperature information from the temperature sensor 60. However, in some embodiments, the CAT 50 may enable the UIM 38 to acquire temperature information directly from the temperature sensor 60. In this regard, for example, the UIM processor 54 may conduct signaling or exchange messages with the temperature sensor 60 to acquire the temperature information in some cases.

In an exemplary embodiment, the CAT 50 may provide a command qualifier to enable the UIM processor 54 to issue a command to the mobile terminal 10 (e.g., to the controller 20) requesting information in a coded format. The coded format may include unique codes for various different requests. Thus, for example, a particular bit or set of bits (e.g., one byte in one example) in a coded message may indicate what information is requested (e.g., temperature information) and, if desired, another bit or set of bits in the coded message may indicate a format (e.g., the desired units such as Fahrenheit or Celsius) in which the requested information is to be provided to the UIM 38.

After receipt of a command from the CAT 50 with respect to temperature information, the controller 20 may obtain the temperature information from the temperature sensor 60 as described above, and provide the temperature information to the UIM 38. The UIM 38 may thereafter perform a function with respect to the temperature information received. In some examples, the function performed with respect to the temperature information may include recording or reporting the temperature information. Moreover, the locations or devices to which the recording or reporting may be performed may be varied according to different applications of embodiments of the present invention. In this regard, for example, in some cases it may be desirable to store the temperature information in a remote memory 62. Of note, the term "remote" in this context is used in relation to the UIM 38 and not necessarily in relation to the mobile terminal 10. For example, the remote memory 62 could be the memory of the mobile terminal (e.g., volatile memory 40 or non-volatile memory 42). However, in some alternative embodiments, the remote memory 62 may be a server or other network device. For example, a customer database or home location registry (HLR) may store customer data (including temperature information) for correlation with customer service issues related to each customer. Thus, in some cases, the temperature information may be reported to or recorded at a network device associated with the network operator so that, for example, the operator may have a database for one or more specific conditions encountered by each of a plurality of mobile terminals. The database may then be accessed for resolution of warrantee issues relative to concerns over whether the warranty has been voided by exposure to excessive temperatures or other environmental conditions.

In situations where the temperature information is reported to the network operator, the mobile terminal 10 may communicate the temperature information by any suitable communication method. For example, a short message service (SMS) message could be used by the mobile terminal 10 to access the remote memory 62. However, the mobile terminal 10 may also communicate in accordance with, for example, radio frequency (RF), Bluetooth (BT), Infrared (IR) or any of a number of different wireline or wireless communication techniques, including LAN, wireless LAN (WLAN), Worldwide Interoperability for Microwave Access (WiMAX), WiFi, ultra-wide band (UWB), Wibree techniques and/or the like. As such, the mobile terminal 10 may be enabled to communicate with the remote memory by any of numerous different access mechanisms including, for example, mobile access mechanisms such as wideband code division multiple access (W-CDMA), CDMA2000, global system for mobile communications (GSM), general packet radio service (GPRS) and/or the like, as well as wireless access mechanisms such as WLAN, WiMAX, and/or the like.

In some cases, the UIM 38 may simply store the temperature information in the UIM memory 52. Thus, for example, in cases where a claim is made or some other reason for determining environmental conditions to which the mobile terminal 10 has been exposed is encountered, the CAT 50 may provide a toolkit menu by which the stored temperature information may be accessed. As an alternative or as an additional feature, the UIM 38 may direct storage of the temperature information internally within the mobile terminal 10. Thus, for example, in a situation in which the remote memory 62 is embodied as the memory of the mobile terminal 10, the CAT 50 may direct storage of the temperature information in the memory of the mobile terminal 10. Thus, even if the user attempts to replace the UIM 38 to hide temperature history information, the temperature information may still be recorded on the memory of the mobile terminal 10.

As indicated above, the stimulus for obtaining temperature information may be provided in numerous ways. As an example of one way in which temperature information may be acquired, the UIM 38 may utilize a timing function. In this regard, for example, the UIM 38 may periodically poll the mobile terminal 10 for temperature information at certain intervals. The CAT 50 may provide toolkit command timer management for the operation of a timer that counts up or down to a particular value that, when reached, triggers the UIM 38 (e.g., via the UIM processor 54) to issue a command requesting temperature information.

Another example of a stimulus that may be used to initiate the acquisition of temperature information may include the recognition of a triggering event. In this regard, the CAT 50 may define a CAT command related to setting up an event list. The event list may define criteria, which if met may trigger a particular response. As an example, the event list may be used to define a range of temperature values including a maximum and/or a minimum temperature value. The values may be provided to the mobile terminal 10 (e.g., via the controller 20) such that the mobile terminal 10 monitors temperature readings from the temperature sensor 60 and if a temperature reading is above the maximum or below the minimum temperature value defined in the event list, the mobile terminal 10 may report the corresponding temperature to the UIM 38 for the UIM 38 to report or record as described above.

Thus, in an exemplary embodiment, a UIM (which is a generic example of a smart card such as a UICC, SIM, USIM, R-UIM or the like) is provided with a CAT that enables the UIM to issue a command directing the mobile terminal in which the UIM is located to provide the UIM with mobile terminal temperature information. The UIM may thereafter perform a function with respect to the temperature information such as report or recording the temperature information.

FIG. 6 is a flowchart of a system, method and program product according to exemplary embodiments of the invention. It will be understood that each block or step of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of the mobile terminal or smart card and executed by a processor in the mobile terminal or smart card. As will be appreciated, any such computer program instructions may be loaded onto a computer or other programmable apparatus (e.g., hardware) to produce a machine, such that the resulting computer or other programmable apparatus embody means for implementing the functions specified in the flowchart block(s) or step(s). These computer program instructions may also be stored in an electronic, computer-readable memory that may direct a computer or other programmable apparatus to function in a particular manner, such that the instructions stored in the computer-readable memory produce an article of manufacture the execution of which implements the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

Figure 3:
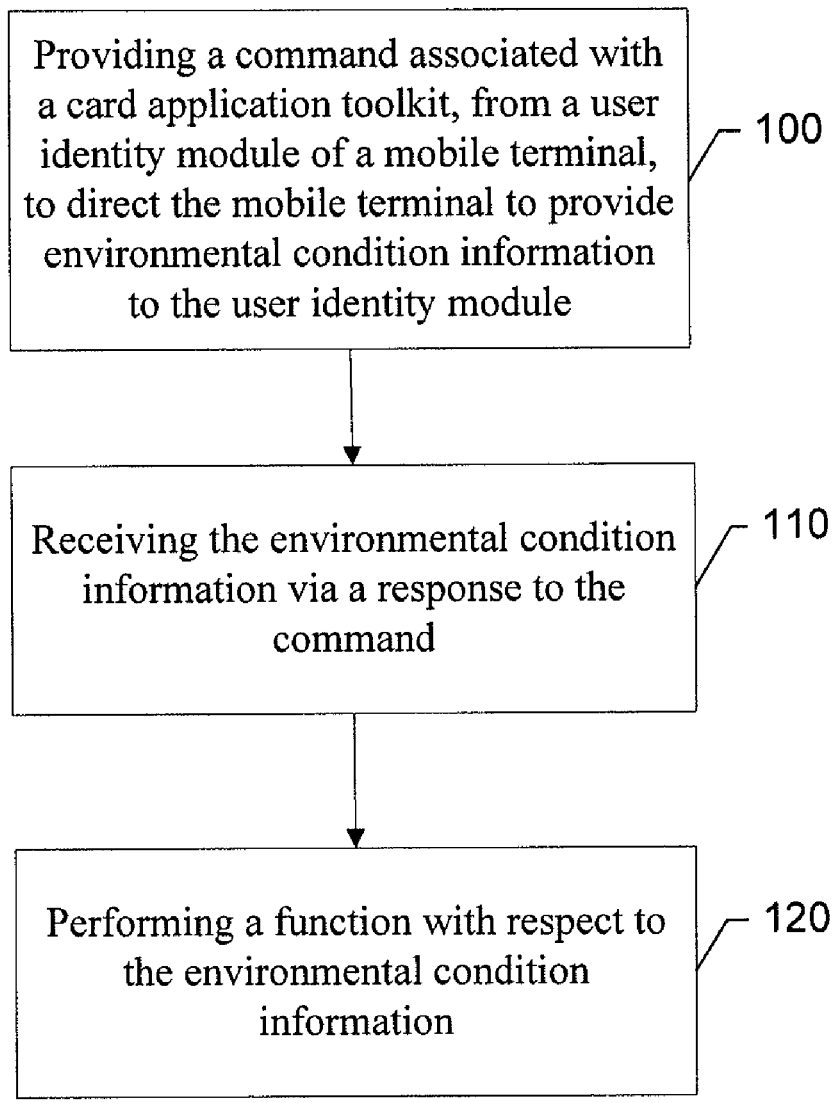
FIG. 3 is a block diagram according to an exemplary method of providing a card application toolkit for reporting terminal environmental information according to one embodiment of the present invention.

In this regard, one embodiment of a method for providing a card application toolkit for reporting terminal environmental information, as shown in FIG. 3, includes providing a command associated with a card application toolkit, from a user identity module of a mobile terminal, to direct the mobile terminal to provide environmental condition information to the user identity module at operation 100. The method may further include receiving the environmental condition information via a response to the command at operation 110 and performing a function with respect to the environmental condition information at operation 120.

In some embodiments, certain ones of the operations above may be modified or further amplified as described below. It should be appreciated that each of the modifications or amplifications herein may be included with the operations and modifications above either alone or in combination with any others among the features described herein. In this regard, for example, providing the command may include directing the mobile terminal to provide the user identity module with temperature information defining a temperature to which a portion of the mobile terminal is exposed. In some cases, providing the command may include providing a coded message indicating an identity of the environmental condition information to be provided and a format (e.g., units) in which the environmental condition information is to be provided. In an exemplary embodiment, performing the function may include recording the temperature information in a memory of the user identity module or in a memory of the mobile terminal. In some cases, performing the function may include reporting the temperature information to a remote network device. In an exemplary embodiment, providing the command may include providing predefined criteria to the mobile terminal in which the predefined criteria define conditions under which the mobile terminal is to communicate the environmental condition information to the user identity module. The predefined criteria may include, for example, a timing routine under which the mobile terminal is to communicate the environmental condition information or an identification of one or more triggering events in response to which the mobile terminal is to communicate the environmental condition information.

In an exemplary embodiment, an apparatus for performing the method of FIG. 3 above may comprise a processor (e.g., the UIM processor 54) configured to perform some or each of the operations (100-120) described above. The processor may, for example, be configured to perform the operations (100-120) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 100-120 may comprise, for example, the UIM processor 54 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:
   at least one processor; and
   at least one memory storing computer program code configured to, with the at least one processor, cause the apparatus or another apparatus to at least perform the following:
   providing a command associated with a card application toolkit, from a user identity module of a mobile terminal, to direct the mobile terminal to provide environmental condition information to the user identity module;
   receiving the environmental condition information via a response to the command; and
   performing a function with respect to the environmental condition information.

2. The apparatus of claim 1, wherein the computer program code for causing the apparatus or the other apparatus to provide the command includes instructions for causing the apparatus or the other apparatus to direct the mobile terminal to provide the user identity module with temperature information defining a temperature to which a portion of the mobile terminal is exposed.

3. The apparatus of claim 1, wherein the computer program code for causing the apparatus or the other apparatus to provide the command includes instructions for causing the apparatus or the other apparatus to provide a coded message indicating an identity of the environmental condition information to be provided and a format in which the environmental condition information is to be provided.

4. The apparatus of claim 1, wherein the computer program code for causing the apparatus or the other apparatus to perform the function includes instructions for causing the apparatus or the other apparatus to record the temperature information in a memory of the user identity module.

5. The apparatus of claim 1, wherein the computer program code for causing the apparatus or the other apparatus to perform the function includes instructions for causing the apparatus or the other apparatus to record the temperature information in a memory of the mobile terminal.

6. The apparatus of claim 1, wherein the computer program code for causing the apparatus or the other apparatus to perform the function includes instructions for causing the apparatus or the other apparatus to report the temperature information to a remote network device.

7. The apparatus of claim 1, wherein the computer program code for causing the apparatus or the other apparatus to provide the command includes instructions for causing the apparatus or the other apparatus to provide predefined criteria to the mobile terminal, the predefined criteria defining conditions under which the mobile terminal is to communicate the environmental condition information to the user identity module.

8. A method comprising:
   providing a command associated with a card application toolkit, from a user identity module of a mobile terminal, to direct the mobile terminal to provide environmental condition information to the user identity module;
   receiving the environmental condition information via a response to the command; and
   performing a function with respect to the environmental condition information.

9. The method of claim 8, wherein providing the command comprises directing the mobile terminal to provide the user identity module with temperature information defining a temperature to which a portion of the mobile terminal is exposed.

10. The method of claim 8, wherein providing the command comprises providing a coded message indicating an identity of the environmental condition information to be provided and a format in which the environmental condition information is to be provided.

11. The method of claim 8, wherein performing the function comprises recording the temperature information in a memory of the user identity module or in a memory of the mobile terminal.

12. The method of claim 8, wherein performing the function comprises reporting the temperature information to a remote network device.

13. The method of claim 8, wherein providing the command comprises providing predefined criteria to the mobile terminal, the predefined criteria defining conditions under which the mobile terminal is to communicate the environmental condition information to the user identity module.

14. A computer program product comprising at least one computer-readable non-transitory storage medium having computer-executable program code portions stored therein, the computer-executable program code portions comprising:
   program code instructions for providing a command associated with a card application toolkit, from a user identity module of a mobile terminal, to direct the mobile terminal to provide environmental condition information to the user identity module;
   program code instructions for receiving the environmental condition information via a response to the command; and
   program code instructions for performing a function with respect to the environmental condition information.

15. The computer program product of claim 14, wherein program code instructions for providing the command include instructions for directing the mobile terminal to provide the user identity module with temperature information defining a temperature to which a portion of the mobile terminal is exposed.

16. The computer program product of claim 14, wherein program code instructions for providing the command include instructions for providing a coded message indicating an identity of the environmental condition information to be provided and a format in which the environmental condition information is to be provided.

17. The computer program product of claim 14, wherein program code instructions for performing the function include instructions for recording the temperature information in a memory of the user identity module.

18. The computer program product of claim 14, wherein program code instructions for performing the function include instructions for recording the temperature information in a memory of the mobile terminal.

19. The computer program product of claim 14, wherein program code instructions for performing the function include instructions for reporting the temperature information to a remote network device.

20. The computer program product of claim 14, wherein program code instructions for providing the command include instructions for providing predefined criteria to the mobile terminal, the predefined criteria defining conditions under which the mobile terminal is to communicate the environmental condition information to the user identity module.

* * * * *